United States Patent
Teletia et al.

(10) Patent No.: US 11,030,179 B2
(45) Date of Patent: *Jun. 8, 2021

(54) EXTERNAL DATA ACCESS WITH SPLIT INDEX

(71) Applicant: Microsoft Technology Licensing, LLC, Redmond, WA (US)

(72) Inventors: Nikhil Teletia, Madison, WI (US); Vinitha Reddy Gankidi, Madison, WI (US); Alan D. Halverson, Verona, WI (US); Jignesh M. Patel, Madison, WI (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 499 days.

This patent is subject to a terminal disclaimer.

(21) Appl. No.: 15/650,827

(22) Filed: Jul. 14, 2017

(65) Prior Publication Data

US 2017/0316043 A1    Nov. 2, 2017

Related U.S. Application Data

(63) Continuation of application No. 14/170,493, filed on Jan. 31, 2014, now Pat. No. 9,715,515.

(51) Int. Cl.
*G06F 16/00* (2019.01)
*G06F 16/22* (2019.01)
(Continued)

(52) U.S. Cl.
CPC ........ *G06F 16/2272* (2019.01); *G06F 16/245* (2019.01); *G06F 3/067* (2013.01); *G06F 16/41* (2019.01)

(58) Field of Classification Search
CPC .... G06F 16/2272; G06F 16/245; G06F 16/41; G06F 3/067
(Continued)

(56) References Cited

U.S. PATENT DOCUMENTS

| 6,502,088 B1 | 12/2002 | Gajda et al. |
| 6,675,205 B2 | 1/2004 | Meadway et al. |

(Continued)

FOREIGN PATENT DOCUMENTS

| CN | 101996250 A | 3/2011 |
| CN | 102799679 A | 11/2012 |

OTHER PUBLICATIONS

"Aster SQL-HTM", Retrieved from <<https://web.archive.org/web/20120617062404/http://www.asterdata.com/sqlh/>>, Jun. 17, 2012, 2 Pages.
(Continued)

*Primary Examiner* — Thanh-Ha Dang
(74) *Attorney, Agent, or Firm* — Alleman Hall Creasman & Tuttle LLP

(57) ABSTRACT

A split-index can be employed for access to external data. The index can be created on a primary data storage system for data stored externally on a secondary data storage system. After creation, the index can be utilized to expedite at least query execution over the externally stored data. The index can be updated upon detection of changes to data. Further, even when the index is not completely up to date, the index can be exploited for query execution. Furthermore, hybrid execution is enabled with the index and without the index.

17 Claims, 11 Drawing Sheets

(51) Int. Cl.
  *G06F 16/245* (2019.01)
  *G06F 3/06* (2006.01)
  *G06F 16/41* (2019.01)

(58) Field of Classification Search
  USPC ........................................................ 707/696
  See application file for complete search history.

(56) References Cited

U.S. PATENT DOCUMENTS

| | | | |
|---|---|---|---|
| 7,028,022 | B1 | 4/2006 | Lightstone et al. |
| 7,847,844 | B2* | 12/2010 | Takemoto ............. G06F 3/0325 348/286 |
| 7,930,277 | B2* | 4/2011 | Ge ...................... G06F 16/8365 707/688 |
| 8,078,584 | B2* | 12/2011 | Sato ...................... G06F 16/951 707/672 |
| 8,219,562 | B1 | 7/2012 | Rothschild et al. |
| 9,002,871 | B2* | 4/2015 | Bulkowski .......... G06F 16/2272 707/763 |
| 9,013,755 | B2* | 4/2015 | Kuraya .............. G06K 9/00456 358/2.1 |
| 9,146,959 | B2 | 9/2015 | Chen et al. |
| 9,563,640 | B2* | 2/2017 | Sudhakar ............ G06F 16/1873 |
| 9,679,002 | B2* | 6/2017 | Serebrennikov ........ G06F 16/36 |
| 9,715,515 | B2* | 7/2017 | Teletia ................ G06F 16/2272 |
| 9,886,483 | B1* | 2/2018 | Harrison ........... G06F 16/24544 |
| 10,158,709 | B1* | 12/2018 | Muniswamy-Reddy .................... G06F 16/252 |
| 10,242,052 | B2* | 3/2019 | Mandre ............. G06F 16/24542 |
| 10,585,867 | B2* | 3/2020 | Horowitz ............ G06F 16/2228 |
| 2002/0035563 | A1* | 3/2002 | Suda ........................ G06F 16/95 |
| 2004/0122807 | A1 | 6/2004 | Hamilton et al. |
| 2004/0230571 | A1 | 11/2004 | Robertson |
| 2005/0231368 | A1 | 10/2005 | Sasaki et al. |
| 2006/0074881 | A1* | 4/2006 | Vembu .................... G06F 16/25 |
| 2007/0143559 | A1* | 6/2007 | Yagawa ................ G06F 3/0625 711/170 |
| 2007/0204162 | A1* | 8/2007 | Rodriguez ........... H04L 9/0872 713/176 |
| 2009/0248619 | A1 | 10/2009 | Das et al. |
| 2010/0250504 | A1 | 9/2010 | Balasubramanian et al. |
| 2010/0293156 | A1* | 11/2010 | Tanaka .................. G06F 16/217 707/718 |
| 2011/0225165 | A1* | 9/2011 | Burstein ............. G06F 16/2272 707/741 |
| 2011/0258179 | A1 | 10/2011 | Weissman et al. |
| 2011/0264668 | A1 | 10/2011 | Hacker et al. |
| 2012/0030477 | A1* | 2/2012 | Lu ...................... G06F 11/1453 713/189 |
| 2012/0117116 | A1 | 5/2012 | Jacobson et al. |
| 2012/0130973 | A1 | 5/2012 | Tamm et al. |
| 2012/0310878 | A1 | 12/2012 | Vuksan et al. |
| 2012/0310916 | A1 | 12/2012 | Abadi et al. |
| 2013/0198159 | A1 | 8/2013 | Hendry |
| 2013/0232152 | A1* | 9/2013 | Dhuse ................ G06F 16/2228 707/741 |
| 2013/0275548 | A1 | 10/2013 | Molaro et al. |
| 2014/0032528 | A1 | 1/2014 | Mandre et al. |
| 2014/0032593 | A1 | 1/2014 | Libenzi et al. |
| 2014/0095470 | A1 | 4/2014 | Chen et al. |
| 2014/0114955 | A1 | 4/2014 | Kulkarni et al. |
| 2014/0156806 | A1* | 6/2014 | Karpistsenko ......... G06Q 50/28 709/219 |
| 2014/0172914 | A1* | 6/2014 | Elnikety ............. G06F 16/9024 707/774 |
| 2014/0195558 | A1 | 7/2014 | Murthy et al. |
| 2015/0032684 | A1* | 1/2015 | Gu Pta ................ G06F 16/2228 707/600 |
| 2015/0220583 | A1 | 8/2015 | Teletia et al. |
| 2015/0234872 | A1 | 8/2015 | Iijima et al. |
| 2015/0309929 | A1* | 10/2015 | Ishii ........................ G06F 3/061 711/117 |
| 2015/0363467 | A1* | 12/2015 | Cao ...................... G06F 16/2272 707/719 |
| 2016/0055225 | A1 | 2/2016 | Xu et al. |
| 2016/0171052 | A1* | 6/2016 | Wei .......................... G06F 16/31 707/741 |

OTHER PUBLICATIONS

"High Performance Connectors for Load and Access of data from Hadoop to Oracle Database", Retrieved from <<http://www.oracle.com/technetwork/bdc/hadoop-loader/connectors-hdfs-wp-1674035.pdf>>, Jun. 2012, 20 Pages.

"Microsoft PolyBase", Retrieved from <<https://www.google.co.in/url?sa=t&rct=j&q=&esrc=s&source=web&cd=1&cad=rja&ved=0CCgQFjAA&url=http%3A%2F%2Fdownload.microsoft.com%2Fdownload%2F6%2F6%2F4%2F66464851-28B6-4434-8204-8563AB7064F2%2FMicrosoft_PolyBase_for_SQL_Server_2012_Parallel_Data_Warehouse_Datasheet.>>, Feb. 21, 2013, 2 Pages.

"Microsoft SQL Server 2012 Parallel Data Warehouse", Retrieved from <<http://www.google.co.in/url?sa=t&rct=j&q=&esm=s&source=web&cd=2&ved=0ahUKEwjumYvMmdzYAhXJE7wKHdjRCOMQFgg3MAE&url=http%3A%2F%2Fdownload.microsoft.com%2Fdownload%2F5%2F0%2F1%2F5015a62e-06bf-4dec-b90a-37d52e279de5%2Fsql_server_2012_parallel_data_warehouse_breakthrough_platform_white_paper.pdf&usg=AOvVaw1_eKIXegALVBPW9CwxU1SA>>, Retrieved Date: Dec. 23, 2013, 31 Pages.

"Relational and Non-Relational Data Living in Peace and Harmony", Retrieved from <<https://docslide.com.br/documents/relational-and-non-relational-data-living-in-peace-and-harmony.html>>, Apr. 10, 2013, 31 Pages.

"The Platform for Building Great Software", Retrieved from <<http://www.greenplum.com/sites/default/files/EMC_Greenplum_Hadoop_DB_TB_0.pdf>>, Retrieved Date: Dec. 24, 2013, 9 Pages.

"Final Office Action Issued in U.S. Appl. No. 14/170,493", dated Jul. 18, 2016, 15 Pages.

"Non Final Office Action Issued in U.S. Appl. No. 14/170,493", dated Dec. 4, 2015, 14 Pages.

"Notice of Allowance Issued in U.S. Appl. No. 14/170,493", dated Mar. 21, 2017, 18 Pages.

Abadi, Daniel, "Classifying the SQL-on-Hadoop Solutions", Retrieved from <<https://web.archive.org/web/20131003000516/http://hadapt.com/blog/2013/10/02/classifying-the-sql-on-hadoop-solutions/>>, Oct. 2, 2013, 4 Pages.

Bajda-Pawlikowski, et al., "Efficient Processing of Data Warehousing Queries in a Split Execution Environment", In Proceedings of the ACM SIGMOD International Conference on Management of Data, Jun. 12, 2011, pp. 1165-1176.

Busby, Steve, "SQL Server 2012 Parallel Data Warehouse Technical Overview", Retrieved from <<https://web.archive.org/web/20131226071346/www.sqlsaturday.com/downloadsessionfile.aspx?presentationid=13889>>, Retrieved Date: Dec. 23, 2013, 34 Pages.

Dean, et al., "Mapreduce: Simplified Data Processing on Large Clusters", In Proceedings of the USENIX Association 6th Symposium on Operating Systems Design and Implementation, Dec. 6, 2004, pp. 137-149.

Dewitt, et al., "Split Query Processing in Polybase", In Proceedings of the ACM SIGMOD International Conference on Management of Data, Jun. 22, 2013, 12 Pages.

Dittrich, et al., "Hadoop++: Making a Yellow Elephant Run Like a Cheetah (Without It Even Noticing)", In Proceedings of the VLDB Endowment vol. 3, Issue 1, Sep. 13, 2010, pp. 518-529.

Dittrich, et al., "Only Aggressive Elephants are Fast Elephants", In Proceedings of the VLDB Endowment, vol. 5, Aug. 1, 2012, 12 Pages.

Elmeleegy, Khaled, "Piranha: Optimizing Short Jobs in Hadoop", In Journal of the VLDB Endowment, vol. 6, Issue 11, Aug. 26, 2013, 12 Pages.

Eltabakh, et al., "Eagle-Eyed Elephant: Split-Oriented Indexing in Hadoop", In Proceedings of the 16th International Conference on Extending Database Technology, Mar. 18, 2013, 12 Pages.

(56) References Cited

OTHER PUBLICATIONS

Hotti, Marko, "Moderni tietovarastointi Big Data", Retrieved from <<http://blogs.technet.com/cfs-filesystemfile.ashx/_key/communtyserver-components-postattachments/00-03-61-39-27/ModerniTietovarasto_5F00_EN_5F00_MARKOHOT.pdf>>, Retrieved Data: Dec. 23, 2013, 23 Pages.

Shankar, et al., "Query Optimization in Microsoft SQL Server PDW", In Proceedings of the ACM SIGMOD International Conference on Management of Data, May 20, 2012, 9 Pages.

* cited by examiner

EXTERNAL DATA ACCESS WITH SPLIT INDEX

CROSS-REFERENCE TO RELATED APPLICATIONS

This application is a continuation of, and claims priority under 35 U.S.C. § 120 to, U.S. patent application Ser. No. 14/170,493, also entitled "EXTERNAL DATA ACCESS WITH SPLIT INDEX," filed on Jan. 31, 2014, the entirety of which is hereby incorporated by reference as if full rewritten herein.

BACKGROUND

The desire to store and analyze large amounts of data, once restricted to a few large corporations, has escalated and expanded. Much of this data is similar to the data that was traditionally managed by data warehouses, and as such, it could be reasonably stored and processed in a relational database management system (RDBMS). More and more often, however, data is not stored in an RDBMS. Rather, the data is stored in different systems including those that do not entail a predefined and ridged data model. One example is Hadoop in which data is stored in a distributed file system (a.k.a. HDFS) and is analyzed with components such MapReduce, among others. Although not strictly accurate, data stored outside a RDBMS, such as in a file system like HDFS, is often termed unstructured while data inside an RDBMS is called structured.

While dealing with structured and unstructured data were separate endeavors for a long time, people are no longer satisfied with this situation. In particular, people analyzing structured data want to also analyze related unstructured data, and want to analyze combinations of both types of data. Similarly, people analyzing unstructured data want to combine it with related data stored in an RDBMS. Still further, even people analyzing data in an RDBMS may want to use tools like MapReduce for certain tasks. Keeping data in separate silos is no longer viable.

Various solutions have emerged that enable both structured and unstructured to be stored and analyzed efficiently and without barriers. One system that emerged is Polybase, which is a feature of a RDBMS parallel data warehouse that provides a single relational view with SQL (Structured Query Language) over both structured and unstructured data.

SUMMARY

The following presents a simplified summary in order to provide a basic understanding of some aspects of the disclosed subject matter. This summary is not an extensive overview. It is not intended to identify key/critical elements or to delineate the scope of the claimed subject matter. Its sole purpose is to present some concepts in a simplified form as a prelude to the more detailed description that is presented later.

Briefly described, the subject disclosure pertains to external data access with a split index. An index can be created locally in a primary data storage system over data stored externally in a secondary data storage system. A created index can be utilized subsequently to accelerate query execution over the data. The index can also be updated to reflect changes made to data and keep the index up to date. In accordance with one aspect, the index can be updated incrementally when there are changes to data. To at least avoid performing an update on every change to data, the index is allowed to be out of date with respect to the external data in accordance with another aspect. Here, even when the index is stale, the index can be exploited for query execution. Other mechanisms including conventional data import or pushdown query computation and import can be employed as a fallback for at least new or unindexed data. Hybrid processing is thus enabled in accordance with yet another aspect.

To the accomplishment of the foregoing and related ends, certain illustrative aspects of the claimed subject matter are described herein in connection with the following description and the annexed drawings. These aspects are indicative of various ways in which the subject matter may be practiced, all of which are intended to be within the scope of the claimed subject matter. Other advantages and novel features may become apparent from the following detailed description when considered in conjunction with the drawings.

DETAILED DESCRIPTION

Conventionally, data storage systems that seek to interact with external data storage systems have employed at least one of two approaches. First, data from a secondary data storage system is imported into a primary data storage system for local processing. Second, a query computation or the like is provided to the secondary data storage system for processing and results returned to the primary data storage system. However, performance of both approaches is suboptimal, especially for selective queries. For example, both approaches can require scanning of large quantities of data.

Details below generally pertain to external data access with a split index. An index is created locally in a primary data storage system for data stored externally in a secondary data storage system. In other words, the index and the data are split. After creation, the index can be employed to expedite execution of queries over external data, including highly selective queries. The index can be updated when data changes. In accordance with one aspect, the index can be updated incrementally when there are changes to data. Further, the index is allowed to be out of date with respect to the external data to avoid the cost associated with performing an update on every change to data. In accordance with another aspect, even when the index is stale, the index can be exploited for query execution. Other mechanisms including conventional data import or pushdown query computation and import can be employed as a fallback for at least new or unindexed data. In other words, hybrid processing is enabled.

Various aspects of the subject disclosure are now described in more detail with reference to the annexed drawings, wherein like numerals generally refer to like or corresponding elements throughout. It should be understood, however, that the drawings and detailed description relating thereto are not intended to limit the claimed subject matter to the particular form disclosed. Rather, the intention is to cover all modifications, equivalents, and alternatives falling within the spirit and scope of the claimed subject matter.

Figure 1:
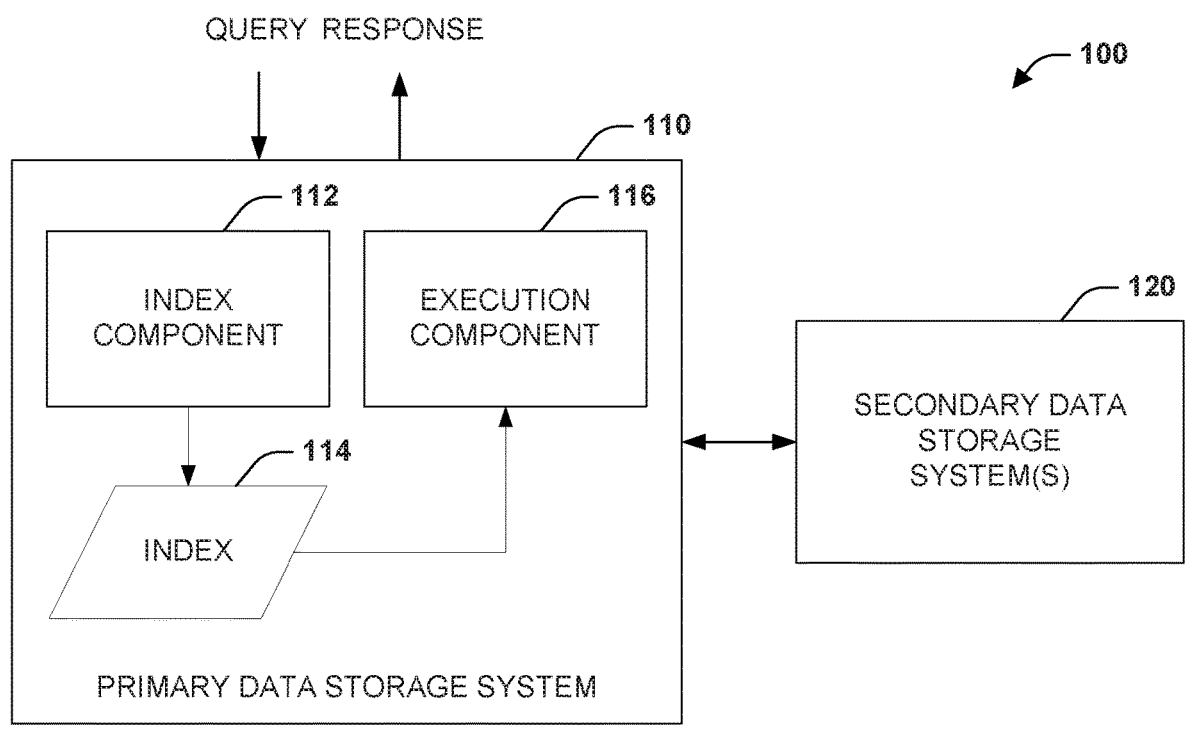
FIG. 1 is a block diagram of an interoperability system.

Referring initially to FIG. 1, system 100 is illustrated that facilitates interoperability amongst data storage systems. The system 100 includes two sub systems, namely primary data storage system 110 and at least one secondary data storage system 120. The primary data storage system 110 and the secondary data storage system 120 can be independent and external to each other. The primary data storage system 110 receives a query and provides a response, and further interacts with the secondary data storage system to acquire data in accordance with a query. Such externally acquired data can alone be returned in response a query or employed in conjunction with data from the primary data storage system to produce results. By way of example, primary data storage system 110 can correspond to a relational database based data warehouse and the secondary data storage system 120 can correspond to a Hadoop system comprising a non-relational distributed file system (a.k.a. HDFS). Of course, the system 100 is not limited thereto. As another non-limiting example, the primary data storage system 110 can be embodied as a relational database management system (RDBMS) and the secondary data storage system 120 can be embodied as a spreadsheet.

The primary data storage system 110 includes index component 112 configured to create and manage index 114. The index 114 is created locally in the primary data storage system 110 for data stored externally in the secondary data storage system 120. Since the index 114 and the corresponding data it indexes are not collocated, the index 114 can be referred to as a split index. Execution component 116 is configured to execute an acquired query. In one instance, the execution component 116 can execute a query or portion thereof over data stored externally in the secondary data storage system 120 with the index 114. Employment of the index 114 by the execution component 116 can be beneficial with respect to expediting query execution since all data relevant to a query need not be imported from the secondary data storage system to the primary data storage system 110 for evaluation. Additionally, all query relevant data need not be scanned by the secondary data storage system, if query computation is pushed down to the secondary data storage system for execution. Stated differently, query execution with the index 114 enables access to solely data that is necessitated based on a query rather than performing a full scan of a data set.

Figure 2:
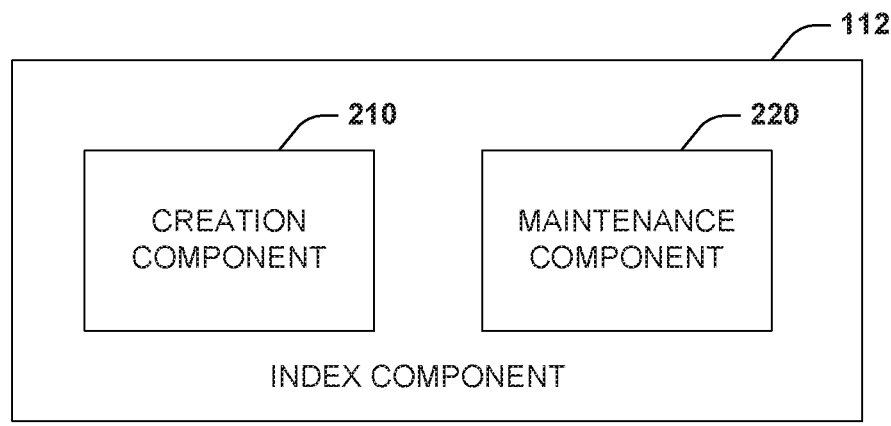
FIG. 2 is a block diagram of a representative index component.

Turning attention to FIG. 2, a representative index component 112 is illustrated in further detail. In particular, the index component 112 includes creation component 210 and maintenance component 220. As the name suggests, the creation component 210 is configured create or otherwise produce or generate an index for externally stored data. For example, the creation component 210 can create a data structure for locally storing the index and construct the index from external data. Further, the creation component 210 can be configured to generate and associate metadata with the index, wherein the metadata subsequently aids in change detection and updating. By way of example, and not limitation, the metadata can comprise a list of files or other structures on which the index is created. The maintenance component 220 is configured to maintain a created index in light of changes to external data. In other words, the maintenance component 220 is configured to update an index to reflect changes made to data and keep the index up to date.

Figure 3:
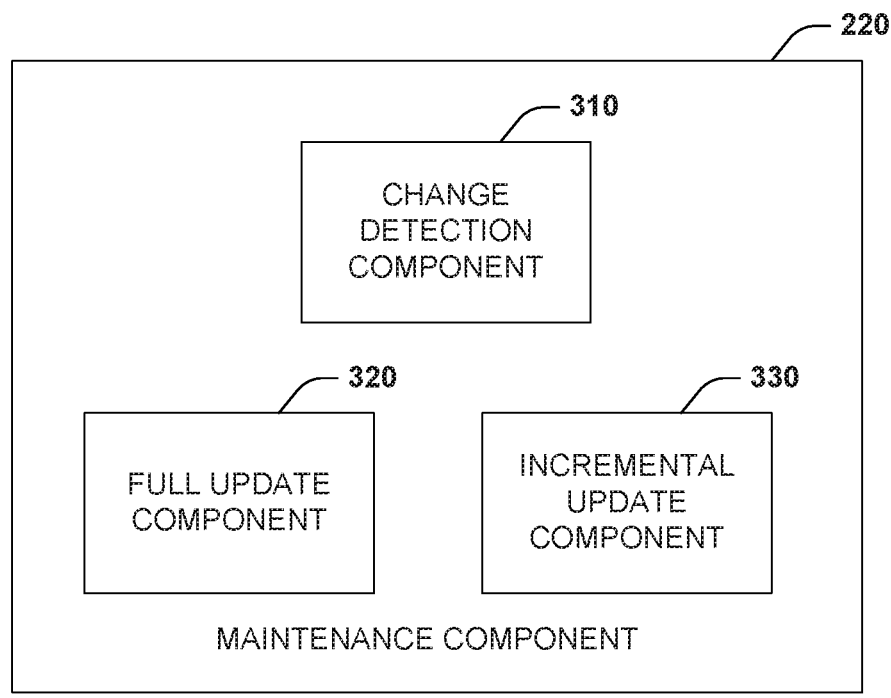
FIG. 3 is a block diagram of a representative maintenance component.

Referring briefly to FIG. 3, a representative maintenance component 220 is illustrated in further detail. Here, the maintenance component 220 includes change detection component 310, full update component 320, and incremental update component 330. The change detection component 310 is configured to determine whether or not data has changed since it was last indexed. In accordance with one embodiment, change detection can be accomplished utilizing index metadata, such as, but not limited to, creation date or last modified date and total length in a simple case. By comparing metadata with external data or metadata regarding the external data, it can be determined whether the index is up to date or stale. For example, if the length of an external data file exceeds the total length recorded by the index, data has been added to the file. This data can correspond to new data that has not been previously indexed or where the external data is immutable, the data can correspond to a change to previously indexed data.

The full update component 320 and incremental update component 330 afford different update modes. The full update component 320 is configured to perform a full update to an index offline upon detection of a change. A full update results in the index being made unavailable for use for a significant time interval while the index is created. Further, a full updated may need to be initiated prior to querying, resulting in increased startup time. The incremental update component 330 is configured to updated the index incrementally inline. In other words, the index can be modified after each change to the external data, at some time interval, or when otherwise triggered. For example, if there are five indexed files and there are three new files, those three files can be read, and added to the index. If one of the files was deleted, the index can be scanned to locate and subsequently delete the file. The downside to the incremental update is the index needs to be locked or otherwise made unavailable while it is updated (e.g., files added or deleted).

Since triggering an index upon each change can be expensive, the execution component 116 can be configured to operate over an index that is out of date with respect to external data. Stated differently, the execution component 116 can be configured to operate in a hybrid mode to ensure correct query execution when an index is stale. In accordance with one embodiment, the external data can be immutable meaning data can solely be added or deleted. Modifications are made by deleting a current data structure and adding a new data structure that captures one or more modifications with respect to a previous version. In this case, despite being stale an index with respect to existing data as opposed to new data can still be employed with the qualification that deleted data structures are identified and filtered out. New or unindexed data can be executed without the index for instance employing conventional mechanisms such as importing external data for local processing and pushing computation to a data storage source and importing results. The conventional mechanisms perform scans over large quantities of data, while use of in index or index scan solely accesses requisite data based on a query. When used in combination with respect to a hybrid mode, this can be referred to as a hybrid scan.

Additionally, hybrid processing allows an asynchronous incremental update process. Stated differently, query execution and incremental updating can be performed substantially concurrently or in parallel. Rather than locking an index and performing all maintenance actions, data changes can be detected and index changes determined while query execution is in progress and without locking the index. When there is a temporary pause in processing or in activity, the changes can be committed, for example by swapping the stale index with the updated index. Consequently, a lock need only be applied for a very short time once the updated is ready to be applied and no one needs to use the index at that time.

In accordance with one embodiment, the execution component 116 can choose to employ an index or not. For instance, according to one aspect the index can be applied as a function of the selectivity of a query or more particularly the selectivity of a query predicate. Here, selectivity refers to the probability that a segment of data will satisfy a predicate or filter expression, which qualifies a query. For example, a high selectivity can be one percent, meaning that is likely that ninety-nine percent of data segments, such as rows, will not have to be scanned if the index is used. If network speed is high between two data storage systems, high selectivity could increase to five or ten percent. In any event, a cost-based evaluation can be made to determine the appropriate selectivity based on a number of factors manually, automatically, or semi-automatically. For example, selectivity can be manually entered by an individual, automatically determined, or determined automatically and approved by an individual or adjusted by an individual based on automatically determined information. In general, however, queries with a small fraction or number of matching tuples, for example, benefit from indexing. According to another aspect, use of an index can depend on an explicit indication that the index should be used. For example, an individual can force the execution component 116 to utilize an index with a query hint or other mechanism to specify this desire with respect to a query. This is useful in instances when an individual knows more about a particular query over a data set than can be automatically discovered or discovered correctly.

In accordance with another aspect, the execution component 116 can bypass or alternatively make use of a native data processing mechanism of the secondary data storage system 120 in acquiring data from the secondary data storage system 120. By way of example and not limitation, the execution component 116, regardless of whether or not the index 114 is utilized, can at least initiate interaction with data stored in a distributed file system with or without employment of MapReduce. In other words, processing can be performed directly on stored data or indirectly by using a native data processing mechanism such as MapReduce.

Additionally, while incremental update and hybrid processing were described with respect to an immutable data structure, they are not limited thereto. Mutable data can also be employed in conjunction with incremental update and hybrid scan. However, additional mechanisms may be employed to address in place modifications, among other things. For example, change detection may be employed in conjunction with data such that portions of the index are determined to be current or out of date while as a whole the index is stale. Queries can then be performed with respect to portions of the index that are current and without the index for the remaining portions that are out of date.

Figure 4:
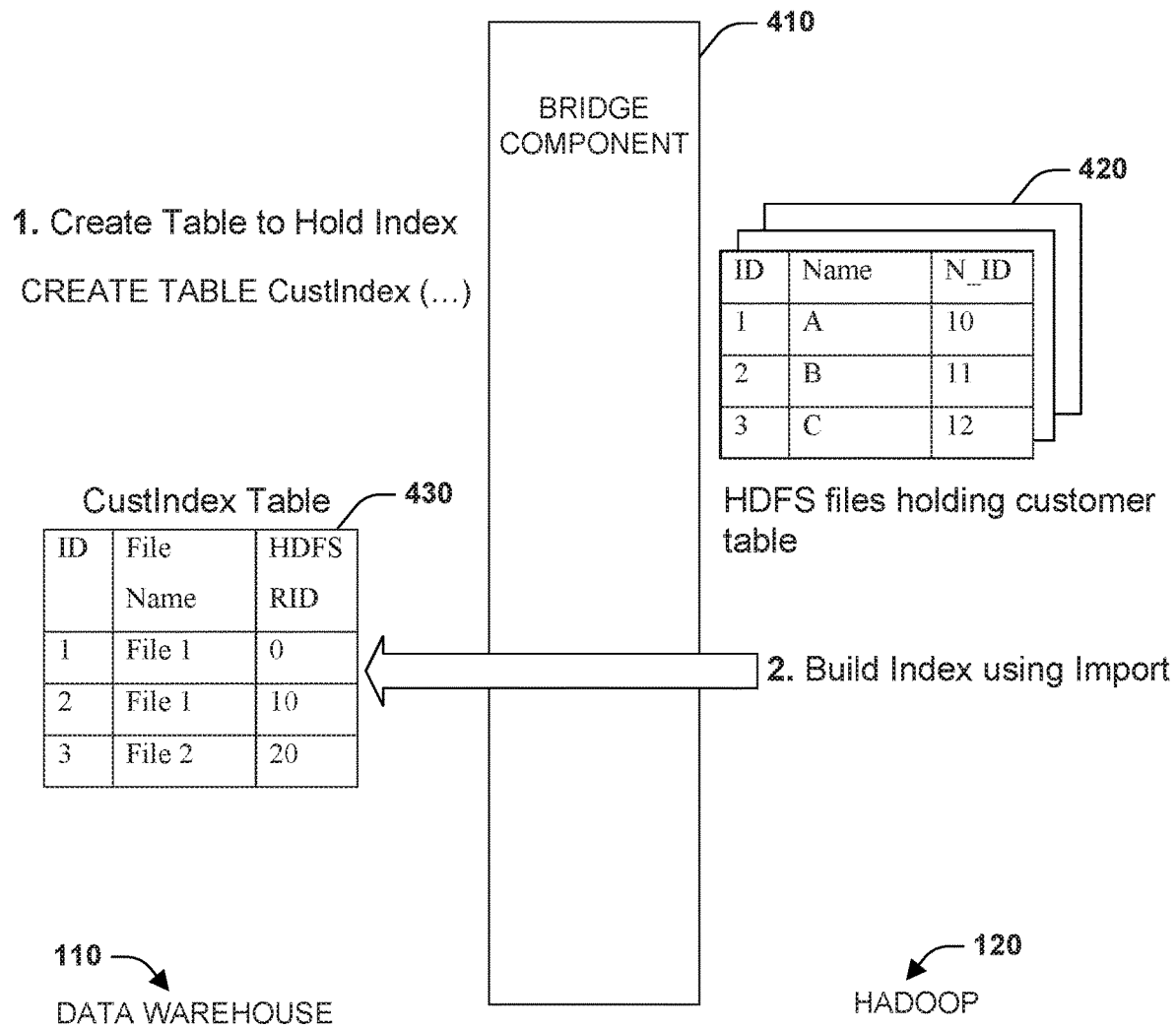
FIG. 4 illustrates an exemplary index creation scenario.
Figure 5:
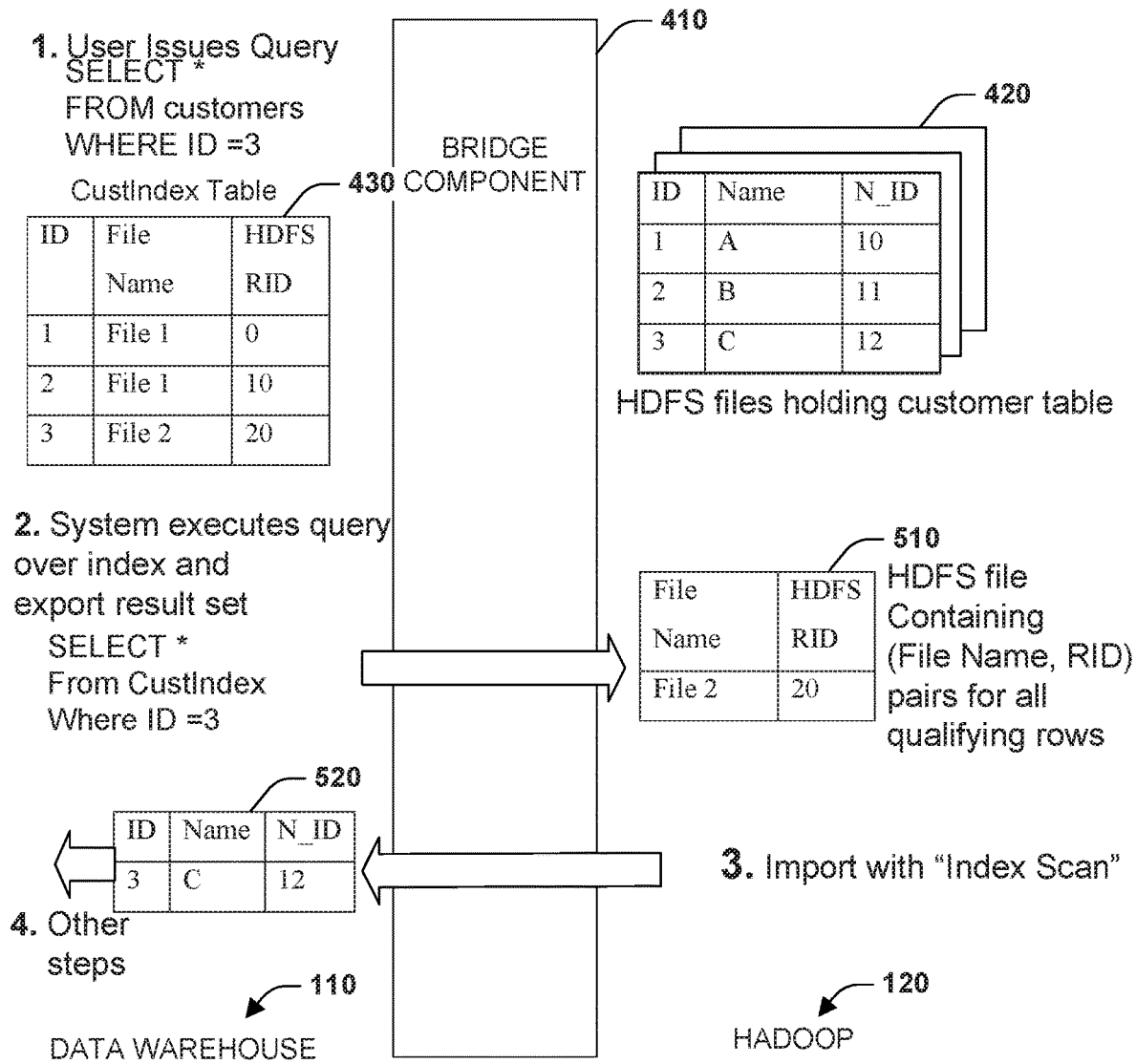
FIG. 5 illustrates an exemplary index usage scenario.

FIGS. 4 and 5 and related description are provided with respect to particular data storage systems. The subject invention, however, is not limited to these specific systems and particulars related thereto. Rather, the figures and description are intended solely to facilitate clarity and understanding with respect to at least a subset of aspects of the subject disclosure in a concrete context.

FIG. 4 illustrates an exemplary index creation scenario. Here, the primary data storage system 110 corresponds to an instance of a relational-based data warehouse and the secondary data storage system 120 corresponds to an instance of Hadoop (e.g., HDFS and MapReduce). Furthermore, the primary data storage system 110 can correspond to a data warehouse that implements Polybase. In accordance with the Polybase implementation, the primary data storage system 110 can include a bridge component 410 that facilitates interaction between the storage systems for each control and compute node data-movement services. The second data storage system 120 includes a plurality of Hadoop distributed file system (HDFS) files storing customer data 420, represented here in a table form. To create an index, a structure is created to hold the index. In this case, a table can be created, named "CustIndex," to hold the index. The table can include a plurality of columns including "ID" (the indexed attribute), "file name" (the name of the HDFS file holding the record), "offset" (the offset of the record from the beginning of the file), "length" (the length of the record), and "blockNumber" (a computed column). The pair of "filename" and "offset" acts as a record identifier (RID) for a row. The RID and length attributes can be used to read the required number of bytes of qualifying records during query execution. The "blockNumber" is a computed column (offset/16 MB), on which rows of the index table are hash partitioned. By distributing the table on the "blockNumber," rows in a 16 MB chuck are ensured to be stored together in the index. For simplicity of discussion, the created index table 430 includes an "ID" (the index attribute), "File Name" (the name of the HDFS file holding the record), and "HDFS RID" (the offset into a file that identifies a record). Once the index table 430 is created, the index can be built by populating the index table 430 with appropriate data. This can be accomplished by employing a record reader operation provided by the bridge component 410 that calculates the physical pointer (RID, length, blockNumber) to a record in addition to indexed attributes. As rows are produced, the import operation can insert them into the index table 430. The list of all HDFS files on which the index is created can be stored as an extended property on the index table. This metadata can be used to facilitate index updating to keep the index current in view of changes to externally stored data.

FIG. 5 illustrates an exemplary index usage scenario. FIG. 5 extends FIG. 4. Thus, FIG. 5 includes the HDFS files storing customer data 420 in a table on the secondary data storage system 120 corresponding to an instance of Hadoop, the index table 430 stored locally on the primary data storage system corresponding to an instance of a data warehouse that supports Polybase, and the bridge component 410 configured to act as a communication interface between the two systems. The primary data storage system 110 can receive a query that request records from a customer table where the customer identifier is equal to three. Specified in T-SQL supported by the primary data storage system, the query is "SELECT*FROM customers WHERE ID=3." Assuming this query includes a predicate involving indexed attributes and that it meets any selectivity requirement for employing the index, the primary data storage system 110 executes the received query over the index resulting in a set of files 510, including file name and record identifier pairs (sorted by file name and RID), which is exported by way of the bridge component 410 to the secondary data storage system 120. The primary data storage system 110 can then generate a temporary table 520 to store the result, and an import operation with an index scan is performed an populates the temporary table with results. Here, the index-scan import operation logically performs a pointer-based join between the HDFS file including "File Name" and "RID" pairs for qualify customer rows and the HDFS files holding customer data, using the "RID" as a pointer to fetch qualifying rows. One implementation is a modified "RecordReaders" scan of the "outer" HDFS file and using (File Name, RID) pairs to read records from the customer file. Since the outer file is sorted on File Name and RID pairs, seeks are minimized. Further, overhead of starting a MapReduce job on the secondary data storage system is avoided. Subsequently, additional steps can be taken such as merging the data with local data warehouse data, among other things.

Note also that compared to data a traditional data base system, rows in Hadoop cannot be updated in place. Rather, new rows can be added by adding new HDFS files to the directory, or existing rows can be deleted by dropping one or more HDFS files from the directory. Given this pattern of data creation and updates, the data in an external table can be classified into three categories: 1) Existing data that is covered by the existing index, 2) New data that is not indexed, and 3) Deleted data that has been dropped in HDFS but is still present in the index.

Indexes can be offline and require issuing a command to update an index. When an update command is issued, an incremental index update method can be invoked, which has two phases: 1) Detecting new/deleted data, and 2) Incrementally updating an existing index. The index can include list of HDFS files that are covered by the index. Accordingly, this metadata can be used to determine new and deleted files.

For new files, an index update can first request the bridge component 410 to scan the new files with a "buildIndex" flag set to true. The bridge component 410 can the return the indexed attribute and the physical pointer to the new records in these files. These records are inserted the index table and the index metadata is updated to add these new files.

For deleted files, the following SQL query can be issued: "DELETE FROM <index_table> WHERE filename IN (<Deleted Files>)." These deleted files can also be removed from index metadata.

The aforementioned systems, architectures, environments, and the like have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component to provide aggregate functionality. Communication between systems, components and/or sub-components can be accomplished in accordance with either a push and/or pull model. The components may also interact with one or more other components not specifically described herein for the sake of brevity, but known by those of skill in the art.

Furthermore, various portions of the disclosed systems above and methods below can include or employ of artificial intelligence, machine learning, or knowledge or rule-based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent. By way of example, and not limitation, the execution component 116 can employ such mechanisms to determine if and when to employ an index to execute queries based a plurality of factors including query selectivity, network connectivity, the data source, and historical performance, among other things.

In view of the exemplary systems described above, methodologies that may be implemented in accordance with the disclosed subject matter will be better appreciated with reference to the flow charts of FIGS. 6-10. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described hereinafter.

Figure 6:
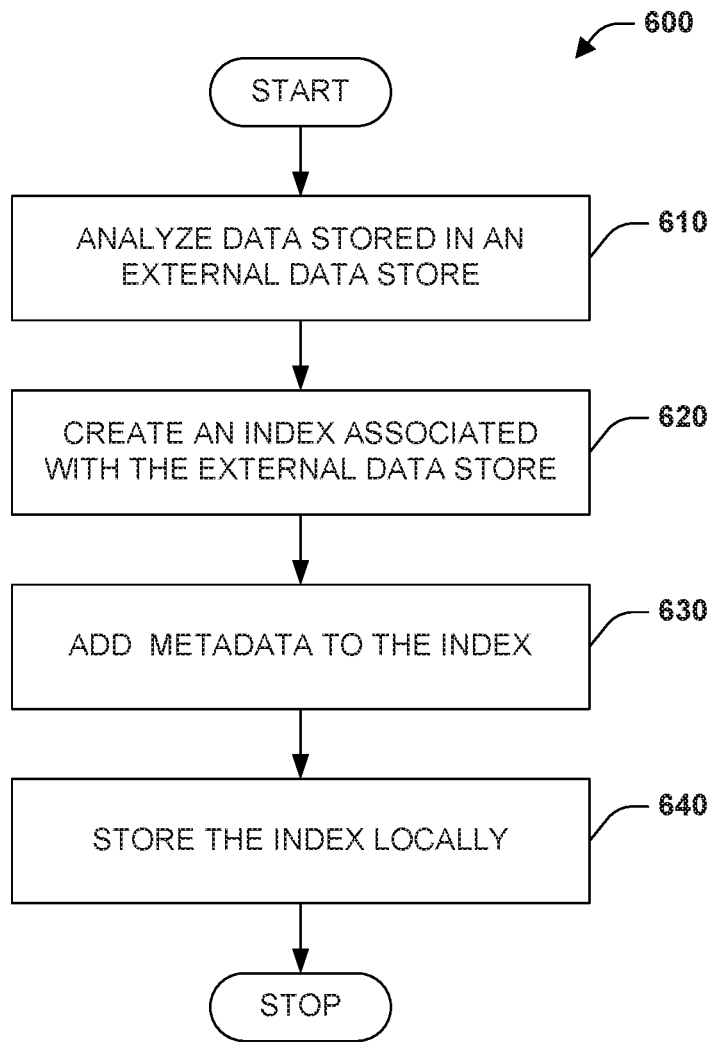
FIG. 6 is a flow chart diagram of a method of index generation.

Referring to FIG. 6, illustrates method 600 of index generation. At reference numeral 610, data stored in an external data store is analyzed. Such analysis can involve acquiring or computing index values including file name, offset or record from the being of a file, length of a record, and record identifier, among others. At numeral 620, an index associated with the external data store is created with index attributes including those acquired during data analysis. At reference numeral 630, metadata is added or otherwise linked to the index. The metadata can be data about the index that is useful in detecting changes and updating the index. Examples of such metadata include but are not limited to a list of all files on which the index is created, creation date, modification data, and file length. At numeral 640, the index and metadata are stored locally, for example on a primary data storage system external to the storage of the data indexed.

Figure 7:
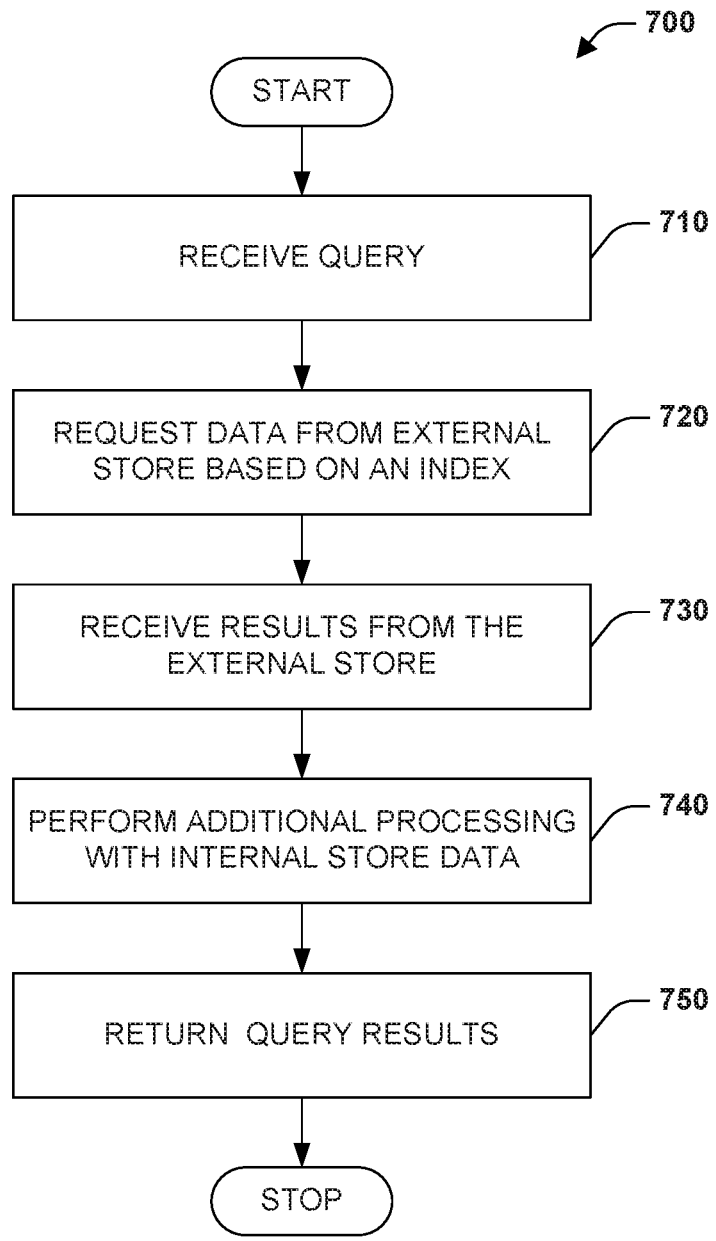
FIG. 7 is a flow chart diagram of a method of query execution with an index.

FIG. 7 depicts a method 700 of query execution with an index. At reference numeral 710, a query is received, retrieved, or otherwise obtained, for example from a user of a primary data storage system. At reference numeral 720, data is requested from a data source external to a primary data storage system such as a secondary data storage system, in accordance with at least a portion of the query based on an index. At numeral 730, results of query execution are received, retrieved, or otherwise obtained or acquired from the external data source. At reference 740, additional processing is performed with internal data store data as specified by the query. For example, the external data may be merged with internal data. At reference numeral 750, results of query execution are returned.

Figure 8:
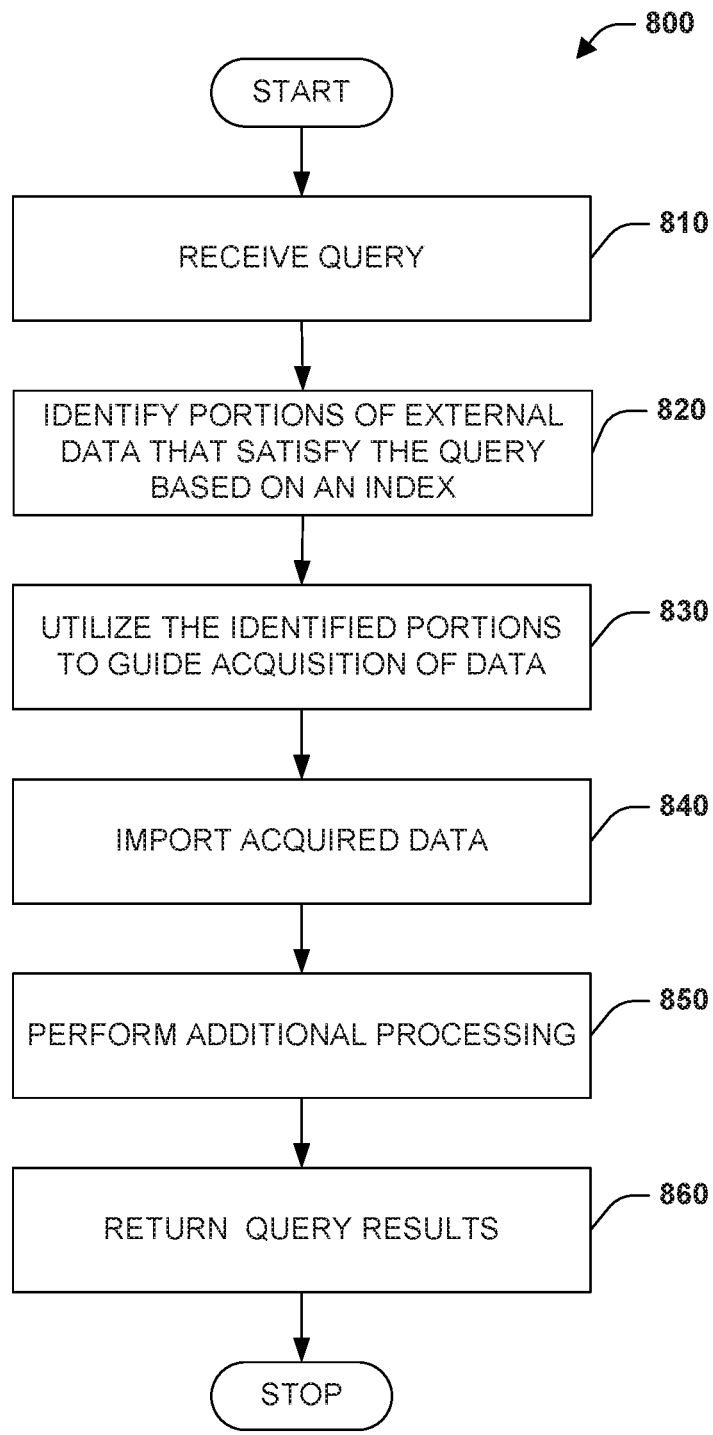
FIG. 8 is a flow chart diagram of a method of index-based query execution.

FIG. 8 illustrates a method 800 of index-based query execution. At reference numeral 810, the query is received, retrieved, or otherwise obtained or acquired, for instance from a user by way of a primary data storage system. At numeral 820, one or more portions of external data that satisfy the query are identified based on an index. At reference 830, the one or more identified portions of external data are utilized to guide acquisition of data from the external data source. The acquired data can subsequently be imported at numeral 840. At reference numeral 850, any additional processing specified by the query is performed. For example, data acquired from an external source can be merged with local data in various ways. At reference 860, results of query execution are returned.

Figure 9:
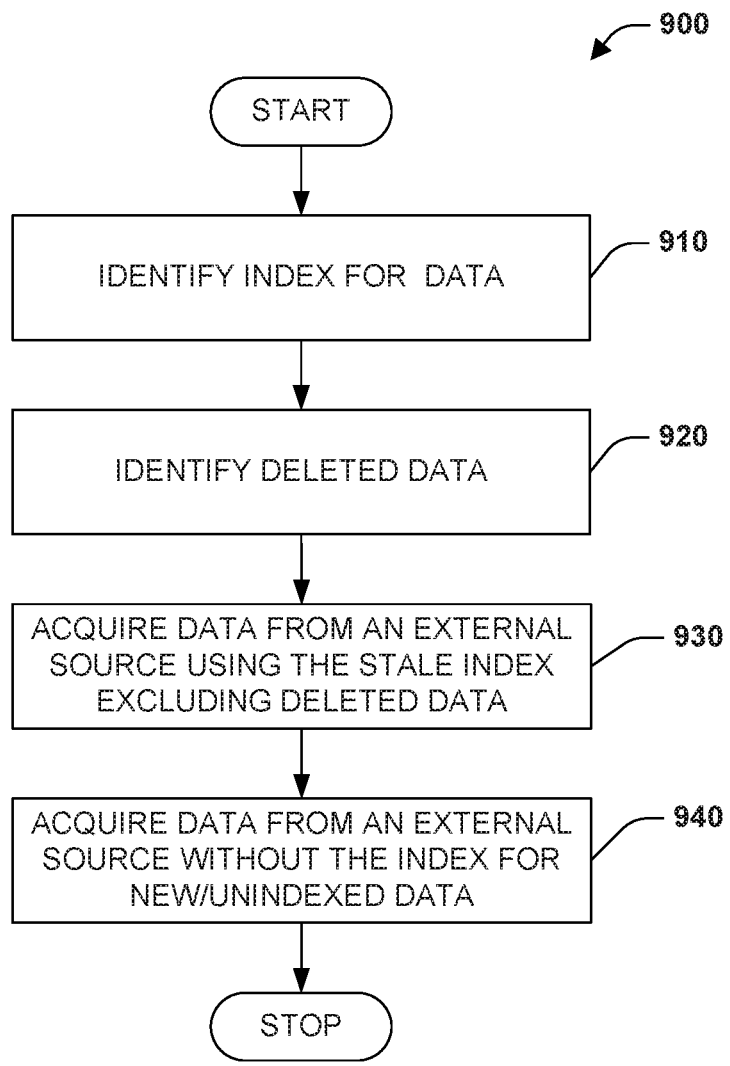
FIG. 9 is a flow chart diagram of a hybrid query-execution method.

FIG. 9 illustrates a hybrid query-execution method 900. At reference numeral 910, a current version of an index for data is identified. In accordance with one aspect, the index can be stale, as changes may have been made with respect to the data. At reference numeral 920, deleted data is identified, for example by determining whether an index references data that is no longer present. At reference numeral 930, data relevant to a query is acquired from an external data source using the index excluding references to deleted data. This can be termed an index scan operation as the index can be used to identify and retrieve specific portions of data that can be relevant to a query. At numeral 940, data relevant to a query is acquired from an external source without the index for new or unindexed data. For example, data can be imported and processed locally or a query computation can be pushed to a secondary data source system for execution and results imported. In either case, a range scan operation can be performed where data within a given pertinent range is scanned. Accordingly, index scan can be performed when possible with fallback to range scan, if necessary. Overall, this can be termed a hybrid scan operation.

Figure 10:
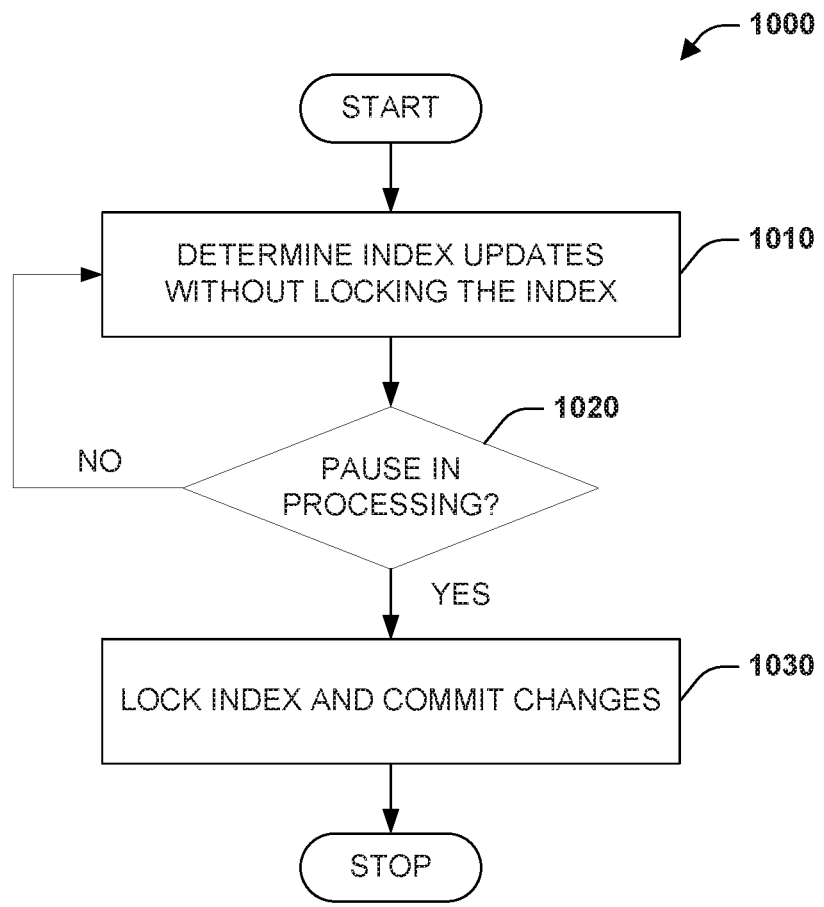
FIG. 10 is a flow chart diagram of a method of incremental index update.

FIG. 10 is a flow chart diagram of a method 1000 of incremental index updated. At reference numeral 1010, index updates are determined without locking or otherwise making the index unavailable. In this manner, query execution and index update determinations can be performed concurrently. Updates can be determined based on changes to targeted data including at least additions and deletions. At numeral 1020, a determination is made as to whether there is a temporary pause in processing or activity. If there is not a pause in processing or activity ("NO"), the method continues at reference numeral 1010, where index updates continue to be determined asynchronously with query execution. If there is a pause in processing or activity ("YES"), the method continues at reference 1030, where the index is locked briefly to commit index changes or updates. In accordance with one embodiment, a previous index can be swapped with an updated index.

The word "exemplary" or various forms thereof are used herein to mean serving as an example, instance, or illustration. Any aspect or design described herein as "exemplary" is not necessarily to be construed as preferred or advantageous over other aspects or designs. Furthermore, examples are provided solely for purposes of clarity and understanding and are not meant to limit or restrict the claimed subject matter or relevant portions of this disclosure in any manner. It is to be appreciated a myriad of additional or alternate examples of varying scope could have been presented, but have been omitted for purposes of brevity.

As used herein, the terms "component" and "system," as well as various forms thereof (e.g., components, systems, sub-systems . . . ) are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The conjunction "or" as used in this description and appended claims is intended to mean an inclusive "or" rather than an exclusive "or," unless otherwise specified or clear from context. In other words, "'X' or 'Y'" is intended to mean any inclusive permutations of "X" and "Y." For example, if "'A' employs 'X,'" "'A' employs 'Y,'" or "'A' employs both 'X' and 'Y,'" then "'A' employs 'X' or 'Y'" is satisfied under any of the foregoing instances.

Furthermore, to the extent that the terms "includes," "contains," "has," "having" or variations in form thereof are used in either the detailed description or the claims, such terms are intended to be inclusive in a manner similar to the term "comprising" as "comprising" is interpreted when employed as a transitional word in a claim.

Figure 11:
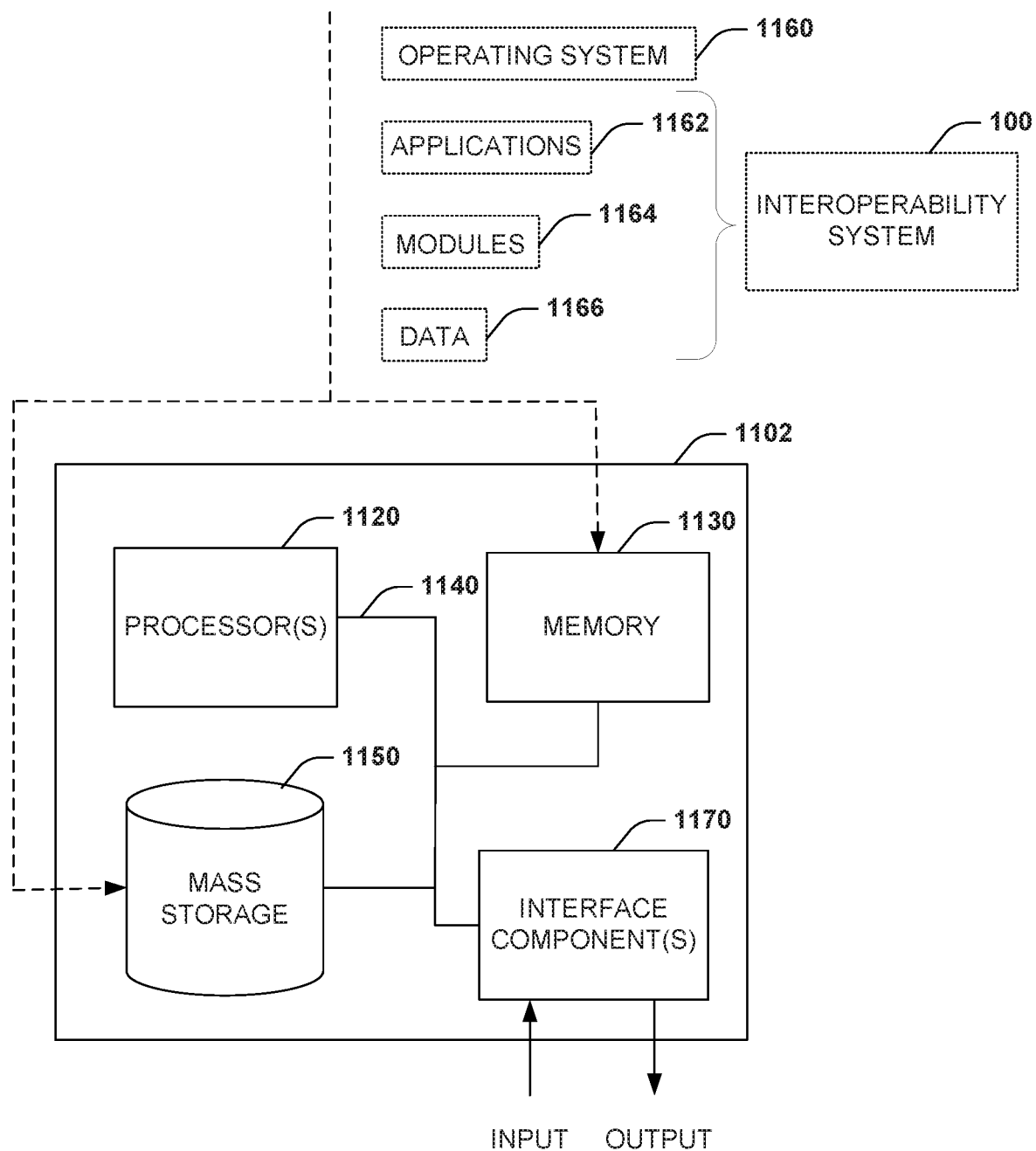
FIG. 11 is a schematic block diagram illustrating a suitable operating environment for aspects of the subject disclosure.

In order to provide a context for the claimed subject matter, FIG. 11 as well as the following discussion are intended to provide a brief, general description of a suitable environment in which various aspects of the subject matter can be implemented. The suitable environment, however, is only an example and is not intended to suggest any limitation as to scope of use or functionality.

While the above disclosed system and methods can be described in the general context of computer-executable instructions of a program that runs on one or more computers, those skilled in the art will recognize that aspects can also be implemented in combination with other program modules or the like. Generally, program modules include routines, programs, components, data structures, among other things that perform particular tasks and/or implement particular abstract data types. Moreover, those skilled in the art will appreciate that the above systems and methods can be practiced with various computer system configurations, including single-processor, multi-processor or multi-core processor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. Aspects can also be practiced in distributed computing environments where tasks are performed by remote processing devices that are linked through a communications network. However, some, if not all aspects of the claimed subject matter can be practiced on stand-alone computers. In a distributed computing environment, program modules may be located in one or both of local and remote memory storage devices.

With reference to FIG. 11, illustrated is an example general-purpose computer or computing device 1102 (e.g., desktop, laptop, tablet, server, hand-held, programmable consumer or industrial electronics, set-top box, game system, compute node . . . ). The computer 1102 includes one or more processor(s) 1120, memory 1130, system bus 1140, mass storage 1150, and one or more interface components 1170. The system bus 1140 communicatively couples at least the above system components. However, it is to be appreciated that in its simplest form the computer 1102 can include one or more processors 1120 coupled to memory 1130 that execute various computer executable actions, instructions, and or components stored in memory 1130.

The processor(s) 1120 can be implemented with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. The processor(s) 1120 may also be implemented as a combination of computing devices, for example a combination of a DSP and a microprocessor, a plurality of microprocessors, multi-core processors, one or more microprocessors in conjunction with a DSP core, or any other such configuration.

The computer 1102 can include or otherwise interact with a variety of computer-readable media to facilitate control of the computer 1102 to implement one or more aspects of the claimed subject matter. The computer-readable media can be any available media that can be accessed by the computer 1102 and includes volatile and nonvolatile media, and removable and non-removable media. Computer-readable media can comprise computer storage media and communication media.

Computer storage media includes volatile and nonvolatile, removable and non-removable media implemented in any method or technology for storage of information such as computer-readable instructions, data structures, program modules, or other data. Computer storage media includes memory devices (e.g., random access memory (RAM), read-only memory (ROM), electrically erasable programmable read-only memory (EEPROM) . . . ), magnetic storage devices (e.g., hard disk, floppy disk, cassettes, tape . . . ), optical disks (e.g., compact disk (CD), digital versatile disk (DVD) . . . ), and solid state devices (e.g., solid state drive (SSD), flash memory drive (e.g., card, stick, key drive . . . ) . . . ), or any other like mediums that can be used to store, as opposed to transmit, the desired information accessible by the computer 1102. Accordingly, computer storage media excludes modulated data signals.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 1130 and mass storage 1150 are examples of computer-readable storage media. Depending on the exact configuration and type of computing device, memory 1130 may be volatile (e.g., RAM), non-volatile (e.g., ROM, flash memory . . . ) or some combination of the two. By way of example, the basic input/output system (BIOS), including basic routines to transfer information between elements within the computer 1102, such as during start-up, can be stored in nonvolatile memory, while volatile memory can act as external cache memory to facilitate processing by the processor(s) 1120, among other things.

Mass storage 1150 includes removable/non-removable, volatile/non-volatile computer storage media for storage of large amounts of data relative to the memory 1130. For example, mass storage 1150 includes, but is not limited to, one or more devices such as a magnetic or optical disk drive, floppy disk drive, flash memory, solid-state drive, or memory stick.

Memory 1130 and mass storage 1150 can include, or have stored therein, operating system 1160, one or more applications 1162, one or more program modules 1164, and data 1166. The operating system 1160 acts to control and allocate resources of the computer 1102. Applications 1162 include one or both of system and application software and can exploit management of resources by the operating system 1160 through program modules 1164 and data 1166 stored in memory 1130 and/or mass storage 1150 to perform one or more actions. Accordingly, applications 1162 can turn a general-purpose computer 1102 into a specialized machine in accordance with the logic provided thereby.

All or portions of the claimed subject matter can be implemented using standard programming and/or engineering techniques to produce software, firmware, hardware, or any combination thereof to control a computer to realize the disclosed functionality. By way of example and not limitation, interoperability system 100, or portions thereof (e.g., index component 112, execution component 116), can be, or form part, of an application 1162, and include one or more modules 1164 and data 1166 stored in memory and/or mass storage 1150 whose functionality can be realized when executed by one or more processor(s) 1120.

In accordance with one particular embodiment, the processor(s) 1120 can correspond to a system on a chip (SOC) or like architecture including, or in other words integrating, both hardware and software on a single integrated circuit substrate. Here, the processor(s) 1120 can include one or more processors as well as memory at least similar to processor(s) 1120 and memory 1130, among other things. Conventional processors include a minimal amount of hardware and software and rely extensively on external hardware and software. By contrast, an SOC implementation of processor is more powerful, as it embeds hardware and software therein that enable particular functionality with minimal or no reliance on external hardware and software. For example, the interoperability system 100 and/or associated functionality can be embedded within hardware in a SOC architecture.

The computer 1102 also includes one or more interface components 1170 that are communicatively coupled to the system bus 1140 and facilitate interaction with the computer 1102. By way of example, the interface component 1170 can be a port (e.g., serial, parallel, PCMCIA, USB, FireWire . . . ) or an interface card (e.g., sound, video . . . ) or the like. In one example implementation, the interface component 1170 can be embodied as a user input/output interface to enable a user to enter commands and information into the computer 1102, for instance by way of one or more gestures or voice input, through one or more input devices (e.g., pointing device such as a mouse, trackball, stylus, touch pad, keyboard, microphone, joystick, game pad, satellite dish, scanner, camera, other computer . . . ). In another example implementation, the interface component 1170 can be embodied as an output peripheral interface to supply output to displays (e.g., LCD, LED, plasma . . . ), speakers, printers, and/or other computers, among other things. Still further yet, the interface component 1170 can be embodied as a network interface to enable communication with other computing devices (not shown), such as over a wired or wireless communications link.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permu-

What is claimed is:

1. A method, comprising:
employing at least one processor configured to execute computer-executable instructions stored in memory to perform the following acts:
creating an index in a primary data storage system describing data stored externally of the primary data storage system in a secondary data storage system, the secondary data storage system being a non-relational distributed file system;
during a period of time during which the index is available for execution with queries of the data within the non-relational distributed file system:
initiating execution of at least a portion of a query with the index over a first portion of the data described by a first portion of the index determined to be current and without the index over a second portion of the data described by a second portion of the index determined to be out of date by initiating a scan of the second portion of the data within the non-relational distributed file system to obtain a query response; and
performing an incremental update to the index for the second portion of the index describing the second portion of the data for which the scan was initiated.

2. The method of claim 1, further comprising acquiring data from the secondary data storage system for at least the portion of the query based on the index.

3. The method of claim 2, further comprising bypassing a native data processing mechanism of the secondary data storage system in acquiring data from the secondary data storage system, wherein the native data processing mechanism of the secondary data storage system includes a MapReduce processing mechanism.

4. The method of claim 1, further comprising determining whether to execute the query using the index at the primary data storage system based on a selectivity of the query, wherein the selectivity is a probability that the query satisfies a filter expression.

5. The method of claim 1, wherein performing the incremental update includes updating the index based on one or more changes to the data stored externally in the secondary data storage system.

6. The method of claim 1, further comprising determining one or more updates to the index based on one or more changes to the data stored externally in the secondary data storage system concurrently with execution of the query at the primary data storage system.

7. The method of claim 6, wherein performing the incremental update includes committing the one or more updates to the index upon a pause in processing activity at the primary data storage system.

8. The method of claim 1, wherein the primary data storage system is a relational data warehouse system.

9. A system, comprising:
a processor coupled to a memory, the processor configured to execute computer-executable instruction including the following computer-executable components stored in the memory:
a first component configured to create an index in a primary data storage system describing data stored externally of the primary data storage system in a secondary data storage system, the secondary data storage system being a non-relational distributed file system; and
a second component configured to, during a period of time during which the index is available for execution with queries of the data within the non-relational distributed file system:
initiate execution of at least a portion of a query with the index over a first portion of the data described by a first portion of the index determined to be current and without the index over a second portion of the data described by a second portion of the index determined to be out of date by initiating a scan of the second portion of the data within the non-relational distributed file system to obtain a query response;
the processor being further configured to execute the computer-executable instructions to perform an incremental update to the index for the second portion of the index describing the second portion of the data for which the scan was initiated.

10. The system of claim 9, wherein the primary data storage system is a relational data warehouse system.

11. The system of claim 9, wherein:
the second portion of the data has been modified since the index was created.

12. The system of claim 9, wherein:
a signal indicates that the index is to be utilized in the execution of the query.

13. The system of claim 9, wherein the second component is configured to perform the incremental update to the index in view of changes to the data.

14. A computer-readable storage device having instructions stored thereon that enable at least one processor to perform a method upon execution of the instructions, the method comprising:
creating an index locally in a relational data warehouse system describing data stored externally of the relational data warehouse system in a non-relational distributed file system;
during a period of time during which the index is available for execution with queries of the data within the non-relational distributed file system:
initiating execution of at least a portion of a query with the index over a first portion of the data described by a first portion of the index determined to be current and without the index over a second portion of the data described by a second portion of the index determined to be out of date by initiating a scan of the second portion of the data within the non-relational distributed file system to obtain a query response; and
performing an incremental update to the index for the second portion of the index describing the second portion of the data for which the scan was initiated.

15. The computer-readable storage device of claim 14, wherein the method further comprises acquiring at least the first portion of the data from the distributed file system for the portion of the query based on the index.

16. The computer-readable storage device of claim 15, wherein the method further comprises acquiring the second portion of the data from the distributed file system for the portion of the query not based on the index.

17. The computer-readable storage device of claim 14, wherein the index incrementally updated in response to one or more changes to the data.

* * * * *